United States Patent
Wiedemann et al.

(10) Patent No.: US 11,258,121 B2
(45) Date of Patent: Feb. 22, 2022

(54) METAL/AIR CELL IN BUTTON CELL FORM AND PRODUCTION METHOD

(71) Applicant: VARTA Microbattery GmbH, Ellwangen Jagst (DE)

(72) Inventors: Cornelia Wiedemann, Aalen (DE); Wolfgang Thorwart, Stödlen (DE); Stefan Senz, Unterschneidheim (DE); Stephan Frosch, Ellwangen (DE); Berthold Bühler, Ellwangen (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 165 days.

(21) Appl. No.: 16/625,377

(22) PCT Filed: Jun. 12, 2018

(86) PCT No.: PCT/EP2018/065451
§ 371 (c)(1),
(2) Date: Dec. 20, 2019

(87) PCT Pub. No.: WO2019/015881
PCT Pub. Date: Jan. 24, 2019

(65) Prior Publication Data
US 2021/0119284 A1    Apr. 22, 2021

(30) Foreign Application Priority Data

Jul. 19, 2017  (EP) .................... 17182064

(51) Int. Cl.
*H01M 50/109*   (2021.01)
*H01M 50/545*   (2021.01)
(Continued)

(52) U.S. Cl.
CPC ........... *H01M 12/06* (2013.01); *H01M 4/661* (2013.01); *H01M 50/109* (2021.01); *H01M 50/46* (2021.01); *H01M 50/545* (2021.01)

(58) Field of Classification Search
None
See application file for complete search history.

(56) References Cited

U.S. PATENT DOCUMENTS

| | | | |
|---|---|---|---|
| 4,892,637 A | 1/1990 | Sauer et al. | |
| 5,846,672 A | 12/1998 | Bennett | |

(Continued)

FOREIGN PATENT DOCUMENTS

| | | |
|---|---|---|
| DE | 35 32 335 | 3/1987 |
| DE | 37 22 019 | 1/1989 |

(Continued)

*Primary Examiner* — Lisa S Park
(74) *Attorney, Agent, or Firm* — DLA Piper LLP (US)

(57) ABSTRACT

A metal/air button cell includes a cell cup having at least one inlet opening via which atmospheric oxygen can enter the interior, the cell cup has an inner side facing the interior, and an oppositely directed outer side, an air cathode is in the form of a cathode disk with a circumferential cathode disk periphery, the air cathode includes a metal collector structure, the cathode disk is arranged such that the cathode disk periphery bears along a circumferential contact zone against the inner side of a cladding region, the cell cup has, on its outer side, at least one recess made by impression and becomes visible as a raised portion on the inner side, and the at least one recess is made in the outer side such that the raised portion exerts a pressure against the cathode disk periphery in the region of the contact zone.

11 Claims, 7 Drawing Sheets

(51) Int. Cl.
    *H01M 50/46*     (2021.01)
    *H01M 4/66*     (2006.01)
    *H01M 12/06*     (2006.01)

(56) References Cited

U.S. PATENT DOCUMENTS

| | | |
|---|---|---|
| 6,066,184 A | 5/2000 | Brenner |
| 2003/0211387 A1 | 11/2003 | Braunger |
| 2005/0196663 A1* | 9/2005 | Takamura ............. H01M 50/10 |
| | | 429/86 |
| 2010/0047666 A1 | 2/2010 | Tatsumi |
| 2013/0183596 A1 | 7/2013 | Gaugler et al. |

FOREIGN PATENT DOCUMENTS

| | | |
|---|---|---|
| DE | 196 47 593 | 5/1998 |
| DE | 102 13 686 | 10/2003 |
| EP | 2 690 687 | 1/2014 |
| WO | 2012/022778 | 2/2012 |

\* cited by examiner

METAL/AIR CELL IN BUTTON CELL FORM AND PRODUCTION METHOD

TECHNICAL FIELD

This disclosure relates to a metal/air cell in button cell form having a housing with an interior in which a metal-containing anode, an air cathode and a separator, which is arranged between the anode and the air cathode, are arranged as well as a method of producing metal/air cells in button cell form.

BACKGROUND

Metal/air cells usually contain as electrochemical active components, a metal-based anode and an air cathode physically separated from one another by a separator but, at the same time, connect to one another by an ion-conductive electrolyte. The separator is usually impregnated with the electrolyte. During discharging, oxygen is reduced at the air cathode while taking up electrons. Hydroxide ions that can migrate via the electrolyte to the anode are produced. There, the metal on which the anode is based is oxidized while releasing electrons. The metal ions produced react with the hydroxide ions.

Both primary and secondary metal/air cells exist. A secondary metal/air cell is recharged by way of a voltage applied between the anode and the air cathode and the described electrochemical reaction being reversed. Oxygen is released in the process.

The best known example of a metal/air cell is the zinc/air cell. The zinc/air cell is used in the form of a button cell, in particular as a battery for hearing aids.

In respect of the terms cell and battery: originally, a clear distinction was made between these terms. Only an electrical interconnection of a plurality of electrochemical cells within the same housing was referred to as a battery. However, in the meantime, single electrochemical cells in a housing are also often referred to as batteries. This broader use of the term "battery" also applies here.

Metal/air cells have a very high energy density since the requirement for oxygen at the air cathode can be covered by ambient atmospheric oxygen. Accordingly, atmospheric oxygen has to be supplied to the air cathode during the discharging process. Conversely, oxygen produced at the air cathode during the charging process of a metal/air cell has to be carried away. For these reasons, metal/air cells generally have housings provided with corresponding inlet and, respectively, outlet openings. Holes are generally stamped into the housings as inlet and, respectively, outlet openings.

Gas-diffusion electrodes are usually employed in metal/air cells as air cathodes. Gas-diffusion electrodes are electrodes in which the materials involved in the electrochemical reaction (generally a catalyst, an electrolyte and atmospheric oxygen) are present alongside one another in solid, liquid and gaseous form and can come into contact with one another. During discharging, the catalyst catalyzes reduction of atmospheric oxygen and, if applicable, also oxidation of hydroxide ions during charging of the cells.

Plastic-bound gas-diffusion electrodes are often used as air cathodes in metal/air cells in button cell form in particular. Gas-diffusion electrodes of this kind are described in DE 37 22 019 A1, for example. In electrodes of this kind, a plastic binder (for example, polytetrafluoroethylene (PTFE)) forms a porous matrix in which particles of an electrocatalytically active material (for example, a precious metal such as platinum or palladium, or of a manganese oxide) are embedded. The particles have to be able to catalyze the mentioned conversion of atmospheric oxygen. Production of electrodes of this kind generally takes place by way of rolling out a dry mixture of the binder and the catalyst to form a film. The film can be rolled into a mesh or expanded lattice of silver, nickel or silver-plated nickel, for example. The metal mesh or the expanded lattice forms a collector structure within the electrode and serves as a current collector.

The mentioned inlet and, respectively, outlet openings for oxygen are generally made in the base of the housing of a metal/air cell, in particular when the cell is a button cell. For oxygen entering through the openings to be able to come into contact with the air cathode as directly as possible, the air cathode in cells of this kind is usually positioned flat on the housing base so that it covers the openings. If applicable, it may be advantageous to provide an air distributor, for example, a porous filter paper between the air cathode and the housing base. However, this is not always required.

If oxygen is now reduced in an air cathode positioned in this way, the electrons released in the process are generally carried away by the mentioned collector structure. The collector structure is usually in direct electrical contact with a part of the housing which can serve as a pole.

We found during measurements made on metal/air cells that cells having the outlined construction often exhibit high variance in respect of their electrochemical properties. For example, individual cells generally have considerably higher impedance values than would have been expected on average. These cells are generally screened out and constitute rejects.

SUMMARY

We provide a metal/air cell in button cell form including a housing with an interior, and in the interior, a metal-containing anode, an air cathode and a separator arranged between the anode and the air cathode, wherein the housing includes a cell cup and a cell top and a seal, the cell cup has a base region, an annular cladding region and a circumferential edge separating the base region and the cladding region, the cell cup has at least one inlet opening in the base region, via which inlet opening atmospheric oxygen can enter the interior, the cell cup and each of its regions has an inner side facing the interior, and an oppositely directed outer side, the air cathode is in the form of a cathode disk with a circumferential cathode disk periphery, the air cathode includes a metal collector structure emerging from the cathode disk at the cathode disk periphery, the cathode disk is arranged in the housing such that the cathode disk periphery bears along a circumferential contact zone against the inner side of the cladding region of the cell cup, the cell cup has, on its outer side, at least one recess made by impression and becomes visible as a raised portion on the inner side of the cell cup, and the at least one recess is made in the outer side of the cladding region such that the raised portion exerts a pressure against the cathode disk periphery in the region of the contact zone.

We also provide a method of producing a metal/air cell in button cell form, which metal/air cell includes a housing with an interior, and a metal-containing anode, an air cathode and a separator arranged between the anode and the air cathode arranged in the interior, wherein the housing includes a cell cup and a cell top and a seal, the cell cup has a base region, an annular cladding region and a circumferential edge separating the base region and the cladding region, the cell cup has at least one inlet opening in the base region, via which inlet opening atmospheric oxygen can enter the interior, the cell cup and each of its regions has an inner side facing the interior, and an oppositely directed outer side, the air cathode is in the form of a cathode disk with a circumferential cathode disk periphery, the air cathode includes a metal collector structure emerging from the cathode disk at the cathode disk periphery, and the cathode disk is arranged in the housing such that the cathode disk periphery bears along a circumferential contact zone against the inner side of the cladding region of the cell cup, the method including forming at least one recess by impression in the outer side of the cell cup such that said recess becomes visible as a raised portion on the inner side of the cell cup and the raised portion presses against the cathode disk periphery in the region of the contact zone.

BRIEF DESCRIPTION OF THE DRAWINGS

FIG. 3b shows a detailed cross section of the zinc/air button cell illustrated in FIG. 3a.

FIG. 4b shows a plan view of a subregion of the tool 400 illustrated in FIG. 4a.

DETAILED DESCRIPTION

It could therefore be helpful to provide means of reducing rejects during production of metal/air cells in button cell form.

Our metal/air cell has a number of features that are already known. For example, the metal/air cell comprises a housing with an interior, and a metal-containing anode, an air cathode and a separator arranged between the anode and the air cathode, in the interior.

In principle, the anode, the air cathode and the separator do not differ from corresponding components of conventional cells. For example, the above-described gas diffusion electrodes are suitable as air cathodes for a metal/air cell. The metal-containing anode is particularly preferably a zinc-containing anode. Therefore, our metal/air cell is preferably a zinc/air button cell.

However, in principle, other oxidizable metals, for example, aluminum can also be used instead of zinc. A suitable separator is, for example, a nonwoven impregnated with electrolyte or a porous plastic film impregnated with electrolyte.

The electrolytes suitable for our metal/air cell are virtually all aqueous solutions, in particular alkaline aqueous solutions.

The cell is in the form of a button cell. The housing of a cell accordingly comprises a cell cup and a cell top as well as a seal. The cell cup and the cell top form—as is customary in button cells—the poles of the cell.

The cell cup has a base region, an annular cladding region and a circumferential edge that separates the base region and the cladding region. The edge can be of sharp design or else rounded.

The cell top is preferably of similar construction. The cell top generally likewise has a base region and an annular cladding region. However, instead of a circumferential edge, the cell top can also have a preferably shoulder-like transition region.

The cell cup and each of its regions has an inner side facing the interior, and an oppositely directed outer side. The same also applies to the cell top and each of its regions.

Both the cell cup and the cell top are preferably in the form of a cup or bowl. They both preferably have a circumferential cut edge, in many instances, forming the opening periphery the cell cup and of the cell top. Preferably, the cut edge of the cell top can be bent over at the end so that a double-walled opening periphery is produced. The opening periphery delimits the respective cladding region and respectively defines an opening via which the interior between the cell cup and the cell top is accessible.

Preferably, the base regions of the cell cup and cell top are of planar form and have a circular or oval geometry. The same preferably also applies to the opening defined by the opening periphery.

The planar base regions of the cell cup and cell top are particularly preferably arranged parallel to one another in the housing.

The annular cladding regions of the cell cup and the cell top preferably have a circular or oval geometry. The annular cladding regions or at least one axial segment of the annular cladding regions are generally oriented orthogonally or at least substantially orthogonally to the associated base regions. The heights of the cladding regions are preferably each constant in the circumferential direction.

In the cell cup, it is preferred for the cladding region to meet the base region at an angle of 90°. In this example, the edge of the cell cup preferably forms a sharp boundary between the base region and the cladding region of the cell cup. The situation is different in the cell top: although an angle of 90° is likewise enclosed in preferred examples of the base region of the cell top with the annular cladding region of the cell top or at least an axial segment of the cladding region, it is preferred for the regions to not directly meet each other. The resulting gap is filled by the preferably shoulder-like transition region.

The cell top is generally inserted into the cell cup with the cut edge or the opening periphery at the front. The seal separates the cell cup and the cell top from one another. The seal should ensure that the two housing parts are electrically insulated from one another. Furthermore, the seal should seal off the housing and prevent electrolyte from leaking.

The housing, which is composed of the cell cup and the cell top, preferably has a cylindrical basic geometry. The base region of the cell cup generally forms a flat bottom side of the housing, while the base region of the cell top forms a flat top side of the housing. The housing is laterally delimited by the cladding region of the cell cup.

The housing is usually closed by beading. To this end, a terminal segment of the cladding region of the cell cup including the opening periphery that delimits the cladding region is impressed radially inward so that a reduction in the cross section of the opening defined by the opening periphery results. Preferably, the beaded opening periphery rests on the transition region of the cell top or on a seal fitted in this region. The cell cup and the cell top are generally connected to one another in an interlocking manner by the beading.

Both the cell cup and the cell top are generally manufactured from metal materials, usually using deep-drawing processes. Nickel-plated deep-drawn sheet-metal or plated composite material comprising a layer of nickel, a layer of copper and an interposed layer of steel or stainless steel (so-called trimetal) are suitable, for example.

The seal is preferably a film seal as described in DE 196 47 593 A1, for example. Film seals composed of a thermoplastic are preferably used. Suitable materials are, for example, polyamide or polyetheretherketone.

However, as an alternative, the seal may also be a conventional injection-molded seal, for example, likewise composed of a polyamide.

Like all known zinc/air cells, our cells also have at least one inlet opening via which atmospheric oxygen can enter the interior. It is preferred here for the inlet opening to be arranged in the base region of the cell cup.

The cell generally has 1 to 10 inlet openings, preferably 1 to 5 inlet openings.

In a zinc/air cell, the air cathode is in the form of a cathode disk with a circumferential cathode disk periphery. The cathode disk is arranged in the housing of the cell such that the cathode disk periphery bears along a circumferential contact zone against the inner side of the cladding region of the cell cup.

As is known, the air cathode of a zinc/air cell comprises a metal collector structure that emerges from the cathode disk at the cathode disk periphery. The collector structure may be, for example, the mesh composed of silver, nickel or silver-plated nickel mentioned at the outset. As an alternative, metal lattices, extended metals, metallized nonwovens and similar electrical conductors can be used.

In general, there is an electrically conductive connection to the cell cup at the points at which the metal collector structure emerges from the cathode disk periphery. The resulting electrical connection to the air cathode determines the polarity of the cell cup.

Analysis of the reject cells with elevated impedance values mentioned at the outset shows that the higher impedance is very often caused by an inadequate electrical connection of the collector structure to the cell cup along the circumferential contact zone.

In contrast to known cells, our cells are distinguished in that the cell cup has, on its outer side, at least one local recess that becomes visible as a raised portion on the inner side of the cell cup, wherein the at least one recess is made in the outer side of the cladding region such that the raised portion exerts a pressure against the cathode disk periphery in the region of the contact zone.

The local recess is made in the outer side of the cell cup by impression. The local recess is preferably delimited at least on both sides in the circumferential direction, preferably on both sides in the circumferential direction and at least on one side in the axial direction.

We surprisingly found that it was possible to significantly reduce the rejection rate during production of zinc/air cells by making the at least one recess. A reduction in the rejection rate by more than 90%, in some instances even by more than 95%, was observed in tests.

There are two possible variants to implement the process of making the at least one recess in the existing processes for producing zinc/air cells. First, the process of making the recess can follow an impedance test in which the functionality of produced cells was checked. The at least one recess is preferably then made only in noteworthy cells. Defective cells with a high impedance can be returned to a normal state by the measure.

Second, the at least one recess can be made after the cell production before carrying out the impedance test too. In this example, the at least one recess is made in all cells.

Preferably, our cells are distinguished by a combination of the following feature a with at least one of the following features b to f:

a. The base region of the cell cup is planar.
b. The cathode disk is oriented parallel to the base region of the cell cup.
c. An air distributor layer is located between the base region of the cell cup and the cathode disk.
d. The separator is in the form of a separator disk with a circumferential separator disk periphery.
e. The separator disk is oriented parallel to the base region.
f. The separator disk rests directly on the cathode disk.

In particular, features a to c as well as e and f are generally realized at the same time. However, in some examples of cells, feature c can be dispensed with, for example, in the applications described in WO 2012/022778 A1.

The air distributor layer may be, for example, a filter paper or some other suitable microporous layer, for example, a nonwoven or a felt.

For production of the button cell, the cathode disk and the separator disk are generally cut out of or stamped out of strip-like foils and sequentially pressed into the cell cup, preferably onto the base region of the cell cup with the at least one inlet opening. The base may be precovered with an air distributor layer. In general, the cathode disk, the separator disk and the air distributor layer are in the form of circular disks with an approximately identical diameter. They then lie flat one on the other in the interior of the housing.

Further preferably, our cells are distinguished by at least one of the following features:

a. The at least one recess is of elongate form, in particular is in the form of a notch.
b. The at least one elongate recess, in particular the notch, extends in the axial direction on the outer side of the cladding region of the cell cup.
c. The at least one elongate recess, in particular the notch, extends axially into the cladding region starting from the circumferential edge of the cell cup.

In principle, the shape of the at least one recess is not critical. For the function of the recess, it is only important that the at least one recess is made in the outer side of the cladding region such that the mentioned pressure is exerted against the cathode disk periphery. However, it has proven advantageous when at least one of the three features a to c just listed above, in particular all three features a to c, is/are realized in the cell according to the invention.

In principle, the absolute dimensions of the at least one recess are also of secondary importance. Typical examples of metal/air button cells are distinguished by an approximately cylindrical physical shape with a cell height of 3.30 mm (PR70 type according to the International Electrotechnical Commission, IEC 60082-2 for short) to 5.40 mm (PR44 type according to the IEC) and a cell diameter of 5.65 mm (PR70 type according to the IEC) to 11.60 mm (PR44 type according to the IEC). In cells of this kind, the recesses in the form of notches extending axially into the cladding region starting from the circumferential edge of the cell cup can have, in preferred examples, a maximum length of up to 0.7 mm and a maximum width of up to 0.4 mm and a maximum depth of up to 0.2 mm, for example.

The maximum depth of the notches preferably is 0.05 mm to 0.10 mm. The maximum length of the notches preferably is 0.3 to 0.5 mm. The maximum width of the notches preferably is 0.05 to 0.30 mm.

Preferably, the cells are distinguished by a combination of the following features:

a. The cladding region of the cell cup comprises a terminal segment which is impressed radially inward to close the housing.

b. The at least one elongate recess extends axially over the cladding region up to the terminal segment starting from the circumferential edge of the cell cup.

Preferably, our cells have more than one local recess which is made by impression. The cell can have a large number of recesses of this kind, preferably 2 to 12 recesses, particularly preferably 2 to 8 recesses, in particular 2 to 6 recesses.

In two or more local recesses, it is preferred, in principle, for the recesses to be distributed uniformly in the circumferential direction over the outer side of the cladding region. This means that adjacent recesses are made in the outer side at equal distances from one another. If the cladding region of the cell cup has a circular geometry, for example, it is preferred, in an example of three recesses, for adjacent recesses to each delimit a circle sector with a center angle of 120°. In an example of four recesses, it is preferred for adjacent recesses to each delimit a circle sector with a center angle of 90°. In six recesses, it is preferred for adjacent recesses to each delimit a circle sector with a center angle of 60°.

The at least one recess is preferably formed by notching or embossing. However, in principle, the choice of the way in which the recess is impressed into the outer side of the cell cup is not critical. It is only important that the recess is made such that it becomes visible as a raised portion on the inner side of the cell cup and the raised portion presses against the cathode disk periphery in the region of the contact zone.

Suitable tools for making the recess will be described further below.

As mentioned above, the at least one recess is preferably made after cell production. Cell production particularly preferably comprises the described step of beading. The at least one recess is particularly preferably made in the outer side of the cell cup immediately after the housing is closed.

Our cells and methods are not only applicable to zinc/air cells. As is known, gas generator cells as described in DE 3532335 A1, for example, have the same construction as zinc/air cells in principle. Therefore, the process of making local recesses in the outer cladding of gas generator cells would have the same positive effect.

Further features, details and advantages can be found in the appended claims, the wording of which is incorporated in the description by reference, in the following description of preferred examples and on the basis of the drawings.

Figure 1A:
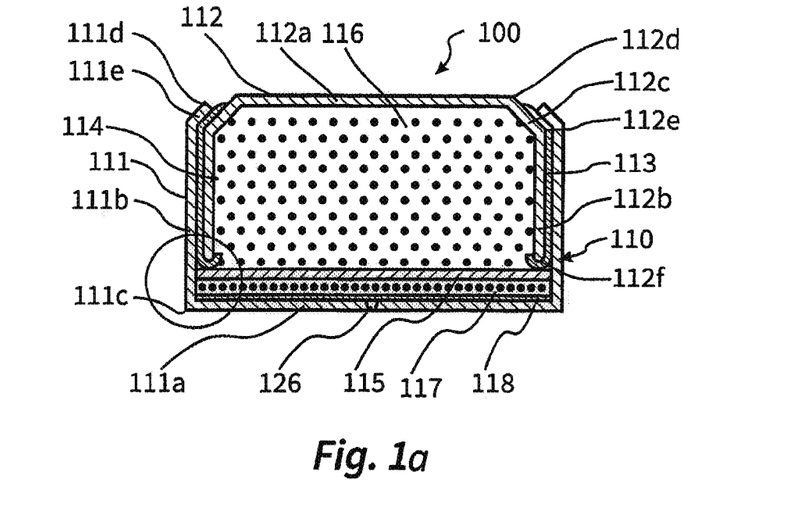
FIGS. 1a and 1b show a schematic illustration of a cross section of a zinc/air button cell known and a partial magnification of this cross section.
Figure 1B:
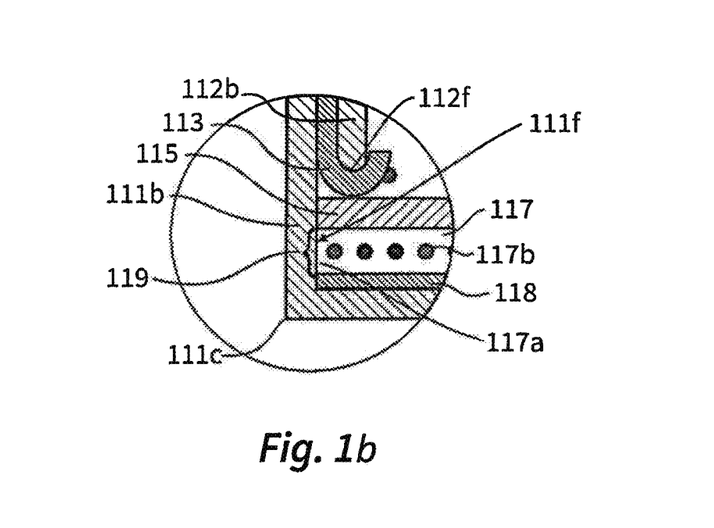

FIG. 1a shows a cross section of a zinc/air cell 100 in a known button cell form. A partial magnification of this cross section is illustrated in FIG. 1b.

The zinc/air cell 100 comprises a metal housing 110 which is composed of a cell cup 111, a cell top 112 and a seal 113.

The cell cup 111 has a circular base region 111a, an annular cladding region 111b and a circumferential edge 111c separating the base region 111a and the cladding region 111b. The cladding region 111b meets the base region 111a at an angle of 90°. At the end, the cladding region 111b is delimited by the cut edge 111d that forms the opening periphery of the cell cup 111.

The cell top 112 has a circular base region 112a, an annular cladding region 112b and a circumferential transition region 112c that connects the base region 112a and the cladding region 112b. The transition region 112c is separated from the base region 112a and the cladding region 112b by the circumferential edges 112d and 112e. The cladding region 112b and the base region 112a enclose an angle of 90°. At the end, the cladding region 112b is delimited by the cut edge 112f that forms the opening periphery of the cell top 112.

The cell top 112 is inserted into the cell cup 111 with the cut edge 112f at the front. The seal 113 separates the cell cup 111 and the cell top 112 from one another. The seal should ensure that the two housing parts, cell cup 111 and cell top 112, are electrically insulated from one another. Furthermore, the seal should seal off the housing 110 and prevent electrolyte from leaking.

The housing 110 is closed by beading. For beading purposes, a terminal segment 111e of the cladding region 111b of the cell cup, including the cut edge 111d, is impressed radially inward. The terminal segment 111e rests on the transition region 112c of the cell top 112 or on the seal 113 which is fitted in this region. The cell cup 111 and the cell top 112 connect to one another in an interlocking manner by the beading. The cell cup and cell top together enclose the interior 114.

The interior 114 is subdivided into two subregions by the disk-like separator 115. A zinc paste is arranged in one of the subregions as anode 116. The anode 116 is in direct contact with the cell top 112. The cell top 112 accordingly forms the negative pole of the illustrated zinc/air button cell 100. The air cathode 117 and the air distributor layer 118 are arranged in the other of the subregions. The separator 115 is impregnated with an alkaline electrolyte and, therefore, hydroxide ions can migrate from the air cathode 117 to the anode 116. The cell cup 111 has the inlet opening 126 in the base region 111a, via which inlet opening atmospheric oxygen can enter the interior 114.

The air cathode 117 is disk-like in the form of a cathode disk and has a circumferential cathode disk periphery 117a. The air cathode comprises a metal collector structure 117b emerging from the cathode disk at the cathode disk periphery 117a. The metal collector structure 117b electrically connects to the cell cup 111 which accordingly forms the positive pole of the illustrated zinc/air button cell 100. To this end, the cathode disk periphery 117a bears along a circumferential contact zone 119 against the inner side 111f of the cladding region 111b of the cell cup 111.

Figure 2A:
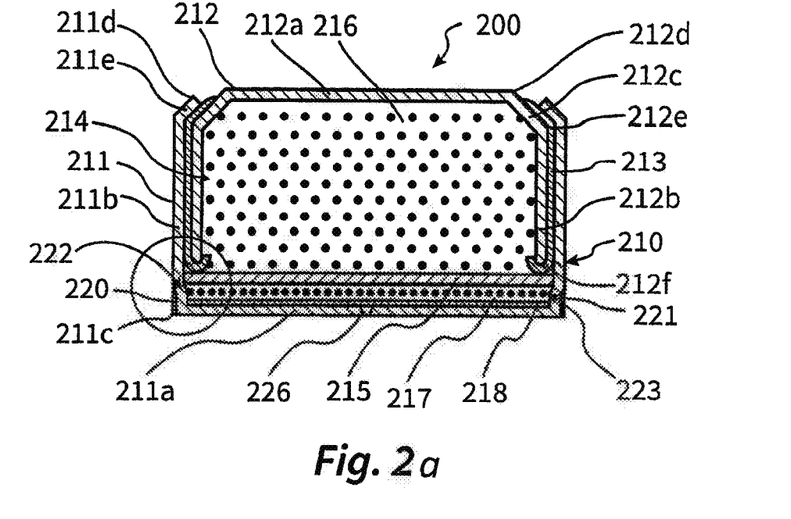
FIGS. 2a and 2b show a schematic illustration of a cross section of an example of a zinc/air button cell and a partial magnification of this cross section.
Figure 2B:
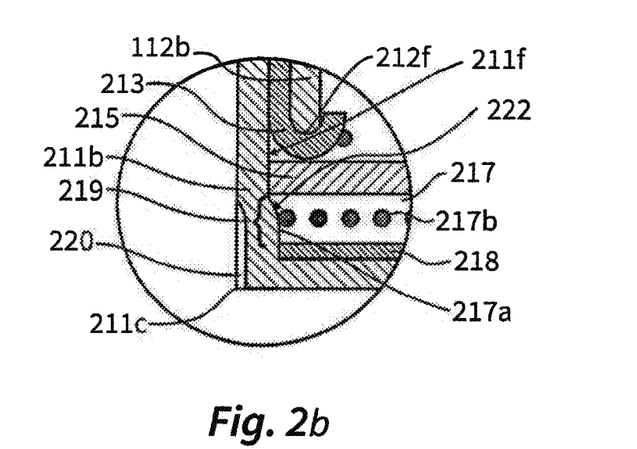

FIG. 2a shows a cross section of an example of a zinc/air button cell 200. A partial magnification of this cross section is illustrated in FIG. 2b.

The zinc/air button cell 200 comprises a metal housing 210 composed of a cell cup 211, a cell top 212 and a seal 213.

The cell cup 211 has a circular base region 211a, an annular cladding region 211b and a circumferential edge 211c separating the base region 211a and the cladding region 211b. The cladding region 211b meets the base region 211a at an angle of 90°. At the end, the cladding region 211b is delimited by the cut edge 211d which forms the opening periphery of the cell cup 211.

The cell top 212 has a circular base region 212a, an annular cladding region 212b and a circumferential transition region 212c connecting the base region 212a and the cladding region 212b. The transition region 212c is separated from the base region 212a and the cladding region 212b by the circumferential edges 212d and 212e. The cladding region 212b and the base region 212a enclose an angle of 90°. At the end, the cladding region 212b is delimited by the cut edge 212f forming the opening periphery of the cell top 212.

The cell top 212 is inserted into the cell cup 211 with the cut edge 212f at the front. The seal 213 separates the cell cup 211 and the cell top 212 from one another. The seal should ensure that the two housing parts, cell cup 211 and cell top 212, are electrically insulated from one another. Furthermore, the seal should seal off the housing 210 and prevent electrolyte from leaking.

The housing 210 is closed by beading. For beading purposes, a terminal segment 211e of the cladding region 211b of the cell cup, including the cut edge 211d, is impressed radially inward. The terminal segment 211e rests on the transition region 212c of the cell top 212 or on the seal 213 which is fitted in this region. The cell cup 211 and the cell top 212 connect to one another in an interlocking manner by the beading. The cell cup and cell top together enclose the interior 214.

The interior 214 is subdivided into two subregions by the disk-like separator 215. A zinc paste is arranged in one of the subregions as anode 216. The anode 216 is in direct contact with the cell top 212. The cell top 212 accordingly forms the negative pole of the illustrated button cell 200. The air cathode 217 and the air distributor layer 218 are arranged in the other of the subregions. The separator 215 is impregnated with an alkaline electrolyte and, therefore, hydroxide ions can migrate from the air cathode 217 to the anode 216. The cell cup 211 has the inlet opening 226 in the base region 211a, via which inlet opening atmospheric oxygen can enter the interior 214.

The air cathode 217 is disk-like in the form of a cathode disk and has a circumferential cathode disk periphery 217a. The air cathode comprises a metal collector structure 217b emerging from the cathode disk at the cathode disk periphery 217a. The metal collector structure 217b electrically connects to the cell cup 211 which accordingly forms the positive pole of the illustrated metal/air cell 200. To this end, the cathode disk periphery 217a bears along a circumferential contact zone 219 against the inner side 211f of the cladding region 211b of the cell cup 211.

The cell cup 211 has, on the outer side of the cladding region 211b, a plurality of recesses made by impression. A total of six recesses are uniformly distributed over the outer side of the cladding region, the distances between adjacent recesses being the same in each example. The illustrated section includes the recesses 220 and 221. The recesses are each in the form of elongate notches and extend axially upward into the cladding region 211b starting from the circumferential edge 211c of the cell cup 211.

The recesses each become visible as raised portions on the inner side 211f of the cell cup 211. The raised portions 222 and 223 corresponding to the recesses 220 and 221 are clearly shown. A local reduction in the inside radius of the cell cup occurs in the region of the raised portions. The raised portions therefore exert a pressure against the cathode disk periphery 217a in the region of the contact zone 219.

As a result of this pressure, the electrical connection of the collector structure 217b to the cell cup 211 in the peripheral contact zone 219 is considerably improved.

Figure 3A:
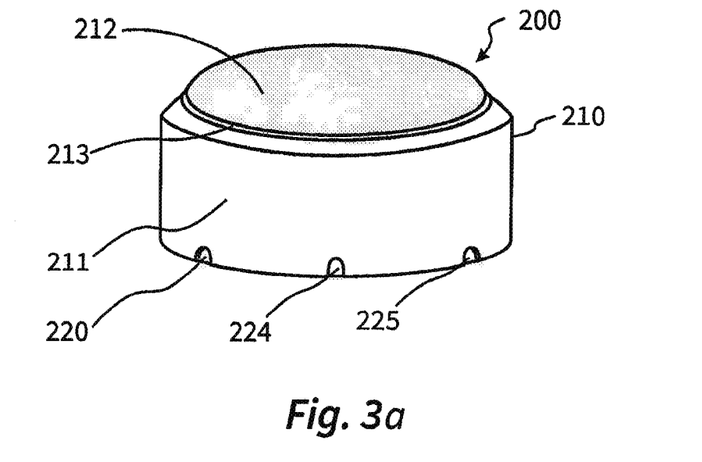
FIG. 3a shows a plan view, obliquely from above, of the zinc/air button cell illustrated in FIGS. 2a and 2b.

FIG. 3a shows a plan view of the cell illustrated in FIG. 2a, obliquely from above.

The figure illustrates the cell cup 211, the cell top 212 and the seal 213. Only the recess 220 from amongst the recesses illustrated in FIG. 2a is shown here. The recess 221 is located in a concealed manner on the rear side of the cell. However, the recesses 224 and 225 not included in the section depicted in FIG. 2a are additionally illustrated here.

Figure 3B:
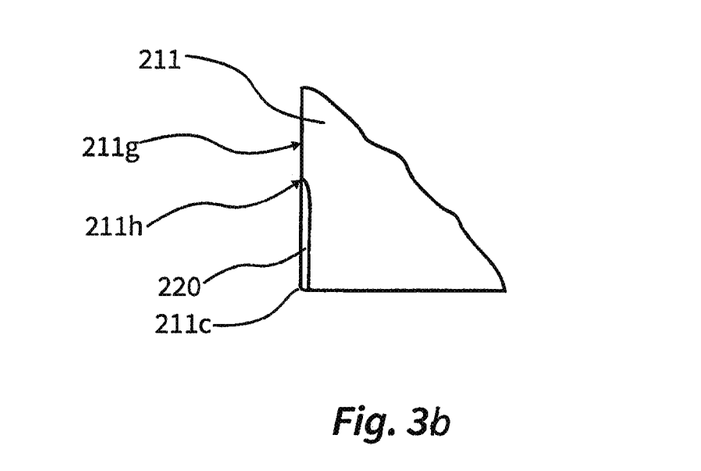

FIG. 3b shows a detailed cross section, passing through the recess 220, of the cell 200 illustrated in FIG. 3a. The figure illustrates the outer side 211g of the cell cup 211 together with the recess 220 made therein. The recess 220 is delimited on both sides in the circumferential direction. The axial extent of the recess extends from the edge 211c to the point 211h. The recess is delimited on one side at the top in the axial direction by the point 211h.

The recess is generally ≤0.7 mm long. If the cell 200 has, for example, the dimensions of a hearing aid battery of the PR44 type, the recess 220 can then have a height of up to 0.7 mm, measured from the edge 211c, a maximum depth of 0.05 to 0.2 mm and a maximum width of up to 0.4 mm.

Figure 4A:
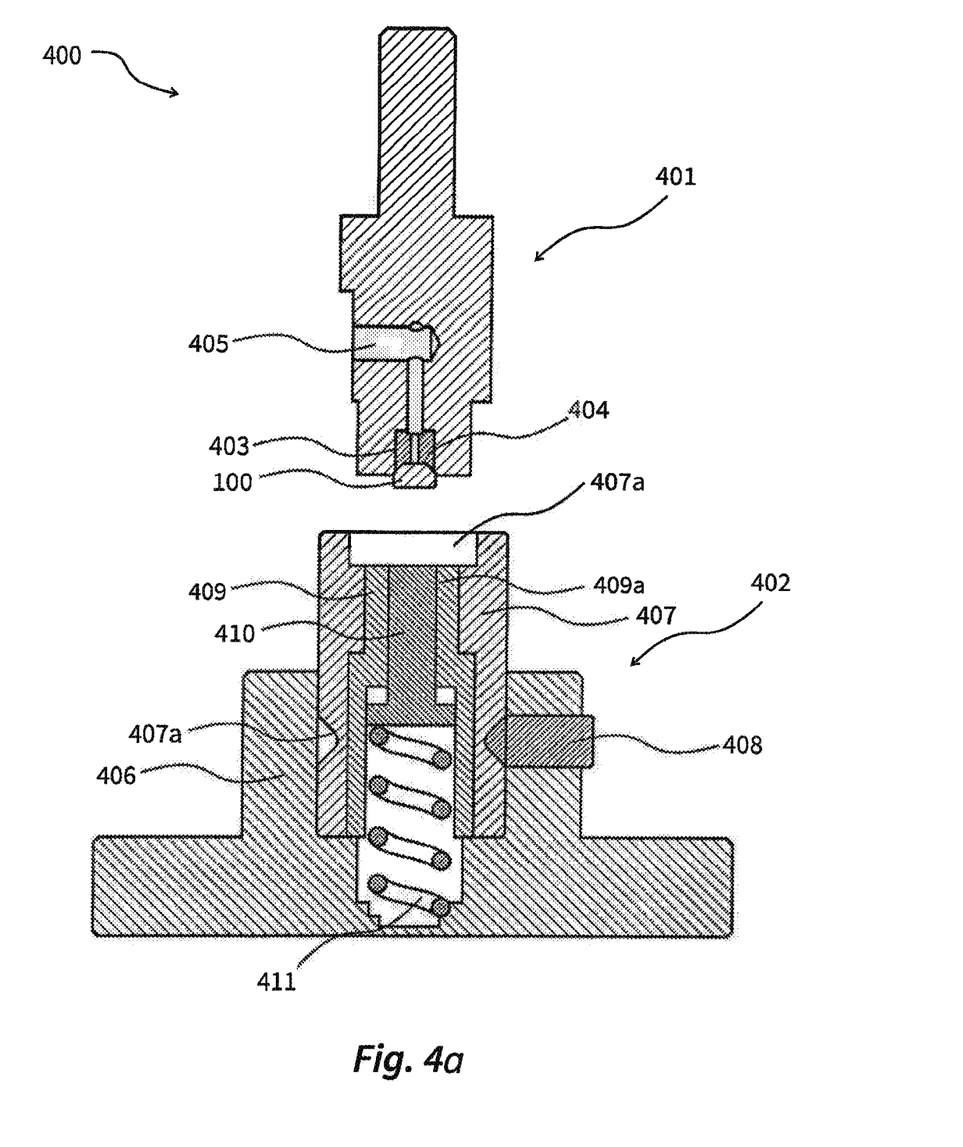
FIG. 4a shows a schematic illustration of a sectional view of a tool suitable for producing metal/air button cells.
Figure 4B:
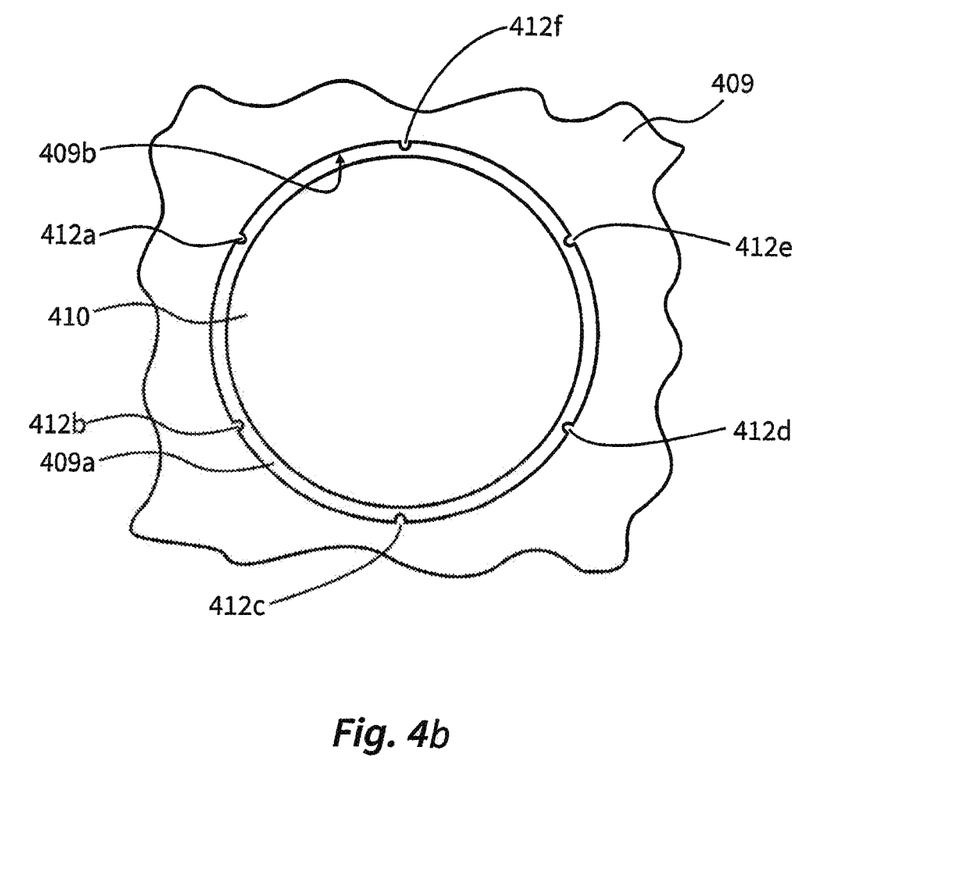
Figure 5:
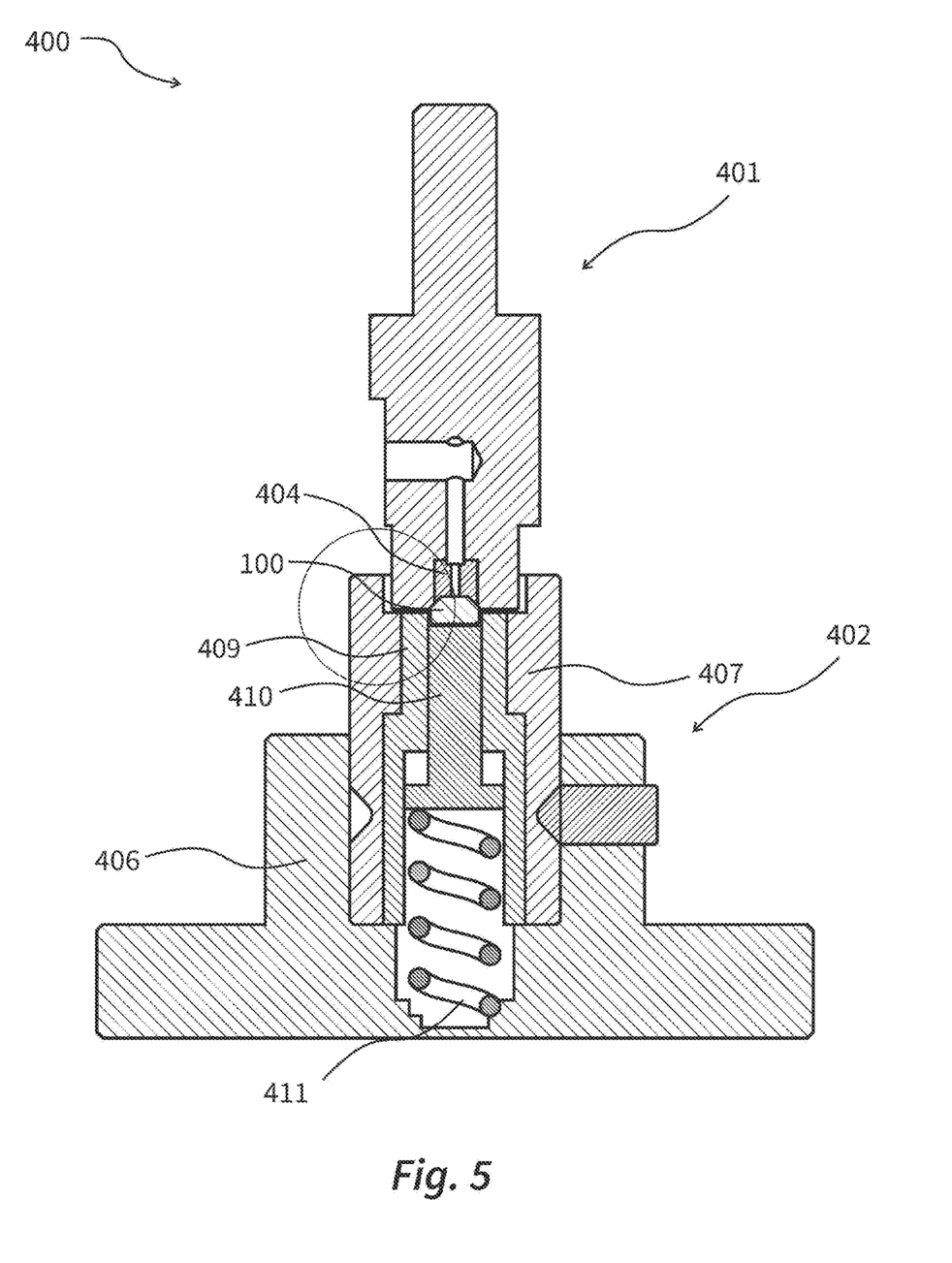
FIG. 5 shows a schematic illustration of the tool illustrated in FIG. 4a during a pressing process.

FIGS. 4a, 4b and 5 show a section of a tool 400 suitable for producing our metal/air button cells. The tool makes recesses in the cladding region of metal/air cells, in particular of zinc/air cells, as are illustrated in FIG. 1a. FIG. 4a shows the tool in the open state, and FIG. 5 shows the tool in the closed state during a pressing process.

The tool 400 comprises a top part 401 and a bottom part 402. The top part 401 has a receptacle 403 into which the exchangeable insert 404 is inserted. The exchangeable insert 404 has, on its bottom side, a receptacle for the cell to be processed, here the zinc/air cell 100 known from FIG. 1a. The top part 401 can be matched to different button cell dimensions and geometries by exchanging the insert 404. The receptacle 404c which is located on the bottom side of the exchangeable insert 404 connects to a negative-pressure source (not illustrated) and can be supplied with negative pressure via the duct 405. The illustrated cell 100 can be held in the receptacle in this way.

The bottom part 402 has a base 406 in which the socket 407 is fixed by a circumferential slot 407a using a locking means 408. The socket 407 has a central, cylindrical duct in which the exchangeable reshaping sleeve 409 is arranged. The reshaping sleeve has a central bore 409a in which the ejector 410 is mounted in an axially displaceable manner A spring 411, with which the ejector 410 can be operated, is located beneath the ejector 410.

During a process of making recesses in the cladding region of the cell 100 which is held in the receptacle of the exchangeable insert 404, the top part 401 is lowered until it sits on the base of the receptacle 407a, as illustrated in FIG. 5. In so doing, the cell 100 is pressed into the bore 409a. The wall of the bore 409a has a plurality of raised portions, not illustrated here, which, during insertion of the cell 100, are pressed into the outer side of the cladding region and in so doing produce the desired recesses. After the process is complete, the cell can be ejected by the ejector 410.

FIG. 4b shows the receptacle 407a perpendicularly from above. The figure illustrates the reshaping sleeve 409 with the bore 409a in which the ejector 410 is arranged. The bore 409a forms a circular receptacle for the cell 100 to be inserted. The wall 409b of the bore 409a has six raised portions 412a-f which protrude into the bore 409a.

Figure 6A:
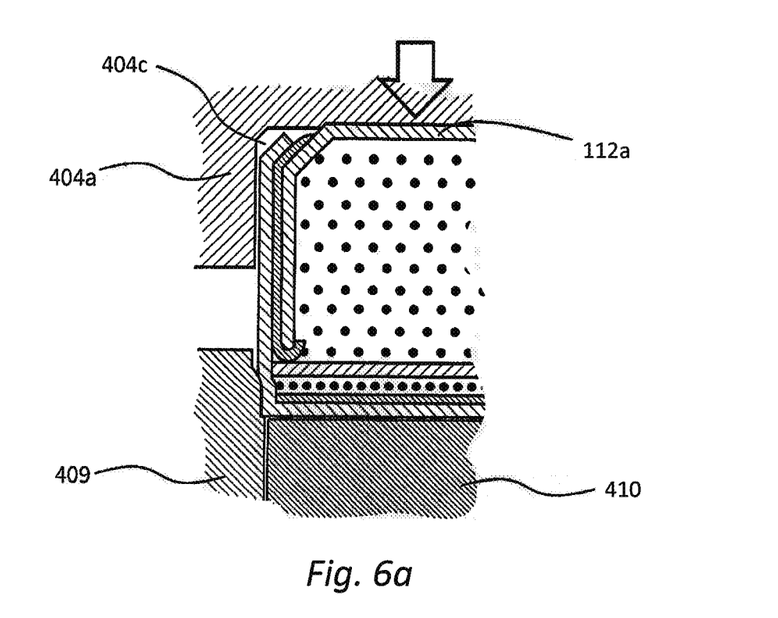
FIG. 6a shows a schematic illustration of a section through a cell during a pressing process using an example of the tool illustrated in FIG. 4a and FIG. 5.
Figure 6B:
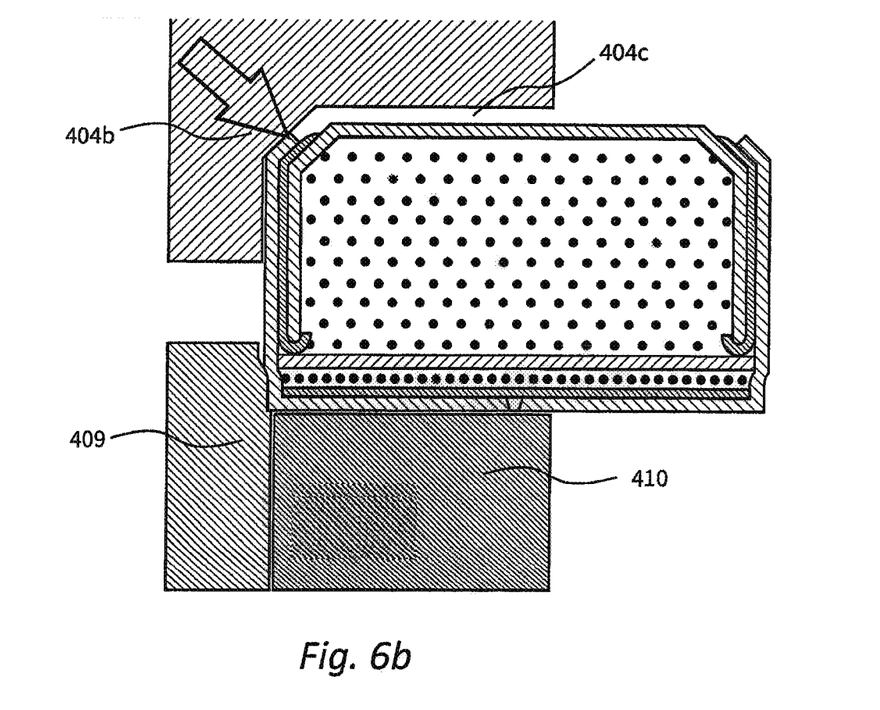
FIG. 6b shows a schematic illustration of a section through a cell during a pressing process with a further example of the tool illustrated in FIG. 4a and FIG. 5.

FIGS. 6a and 6b each show a section through a cell 100 during a pressing process using an example of the tool illustrated in FIG. 4a and FIG. 5 with the top part 401 lowered.

In the example illustrated in FIG. 6a, a variant 404a of the insert 404 is used, which variant is formed such that the base of the receptacle 404c rests flat on the base region 112a of the top 112 of the cell 100 located in the receptacle 404c.

When the top part 401 is lowered, force is accordingly applied to the base region 112a.

In the example illustrated in FIG. 6b, a variant 404b of the insert 404 is used, which variant is formed such that the base of the receptacle 404c rests on the segment 111e of the cell cup 111 of the cell 100 located in the receptacle 404c. When the top part 401 is lowered, force is accordingly applied to the segment 111e and the transition region 112c situated therebeneath and also the interposed seal 113.

EXAMPLE

In impedance tests on the button cell of the type of cell 100 illustrated in FIG. 1a, 336 cells are screened out on account of excessively high impedance values. Six recesses that are uniformly spaced apart from one another in the circumferential direction were made in the outer side of the cladding region of the cell cup of these 336 cells by the tool illustrated in FIGS. 4a, 4b and 5. The cells were then subjected to a new impedance test. It was possible to lower the impedance to normal levels in 311 cells.

The invention claimed is:

1. A metal/air cell in button cell form comprising:
a housing with an interior, and
in the interior, a metal-containing anode, an air cathode and a separator arranged between the anode and the air cathode,
wherein
the housing comprises a cell cup and a cell top and a seal,
the cell cup has a base region, an annular cladding region and a circumferential edge separating the base region and the cladding region,
the cell cup has at least one inlet opening in the base region, via which inlet opening atmospheric oxygen can enter the interior,
the cell cup and each of its regions has an inner side facing the interior, and an oppositely directed outer side,
the air cathode is in the form of a cathode disk with a circumferential cathode disk periphery,
the air cathode comprises a metal collector structure emerging from the cathode disk at the cathode disk periphery,
the cathode disk is arranged in the housing such that the cathode disk periphery bears along a circumferential contact zone against the inner side of the cladding region of the cell cup,
the cell cup has, on its outer side, at least one recess made by impression and becomes visible as a raised portion on the inner side of the cell cup, and
the at least one recess is 1) of elongate form, and extends in an axial direction on the outer side of a shell region of the cell cup, and 2) made in the outer side of the cladding region such that the raised portion exerts a pressure against the cathode disk periphery in the region of the contact zone.

2. The metal/air cell as claimed in claim 1, wherein the base region of the cell cup is of planar form, and the cathode disk is oriented parallel to the base region of the cell cup.

3. The metal/air cell as claimed in claim 1, further comprising an air distributor layer is located between the base region of the cell cup and the cathode disk.

4. The metal/air cell as claimed in claim 1, wherein:
the separator is in the form of a separator disk with a circumferential separator disk periphery,
the separator disk is oriented parallel to the base region, and
the separator disk rests directly on the cathode disk.

5. The metal/air cell as claimed in claim 1, wherein the at least one recess is of elongate form or is a notch.

6. The metal/air cell as claimed in claim 5, wherein the at least one elongate recess extends in an axial direction on the outer side of the cladding region of the cell cup.

7. The metal/air cell as claimed in claim 5, wherein the at least one elongate recess extends axially into the cladding region starting from the circumferential edge of the cell cup.

8. The metal/air cell as claimed in claim 1, wherein the cladding region of the cell cup comprises a terminal segment impressed radially inward to close the housing.

9. The metal/air cell as claimed in claim 8, wherein the at least one elongate recess extends axially over the cladding region up to the terminal segment starting from the circumferential edge of the cell cup.

10. The metal/air cell as claimed in claim 1, wherein the cell cup has, on its outer side, 2 to 12 of the recesses made by impression.

11. A method of producing a metal/air cell in button cell form, which metal/air cell comprises:
a housing with an interior, and
a metal-containing anode, an air cathode and a separator arranged between the anode and the air cathode arranged in the interior,
wherein
the housing comprises a cell cup and a cell top and a seal,
the cell cup has a base region, an annular cladding region and a circumferential edge separating the base region and the cladding region,
the cell cup has at least one inlet opening in the base region, via which inlet opening atmospheric oxygen can enter the interior,
the cell cup and each of its regions has an inner side facing the interior, and an oppositely directed outer side,
the air cathode is in the form of a cathode disk with a circumferential cathode disk periphery,
the air cathode comprises a metal collector structure emerging from the cathode disk at the cathode disk periphery, and
the cathode disk is arranged in the housing such that the cathode disk periphery bears along a circumferential contact zone against the inner side of the cladding region of the cell cup,
the method comprising:
forming at least one recess by impression in the outer side of the cell cup such that said at least one recess 1) is of elongate form and extends in an axial direction on the outer side of a shell region of the cell cup, 2) becomes visible as a raised portion on the inner side of the cell cup, and 3) is formed in the outer side of the cladding region whereby the raised portion presses against the cathode disk periphery in the region of the contact zone.

* * * * *

UNITED STATES PATENT AND TRADEMARK OFFICE
CERTIFICATE OF CORRECTION

| | | |
|---|---|---|
| PATENT NO. | : 11,258,121 B2 | Page 1 of 1 |
| APPLICATION NO. | : 16/625377 | |
| DATED | : February 22, 2022 | |
| INVENTOR(S) | : Buhler et al. | |

It is certified that error appears in the above-identified patent and that said Letters Patent is hereby corrected as shown below:

On the Title Page

At (72) Inventors, please add --Rolf Brenner, Ellwangen (DE)--.

Signed and Sealed this
Second Day of August, 2022

Katherine Kelly Vidal
*Director of the United States Patent and Trademark Office*